Dec. 24, 1946.　　　F. P. WILLCOX　　　2,413,017
LENS COUPLED RANGE FINDER FOR CAMERAS
Filed Oct. 16, 1943　　　3 Sheets-Sheet 1

INVENTOR
FREDERICK P. WILLCOX
BY William D. Hall
ATTORNEY

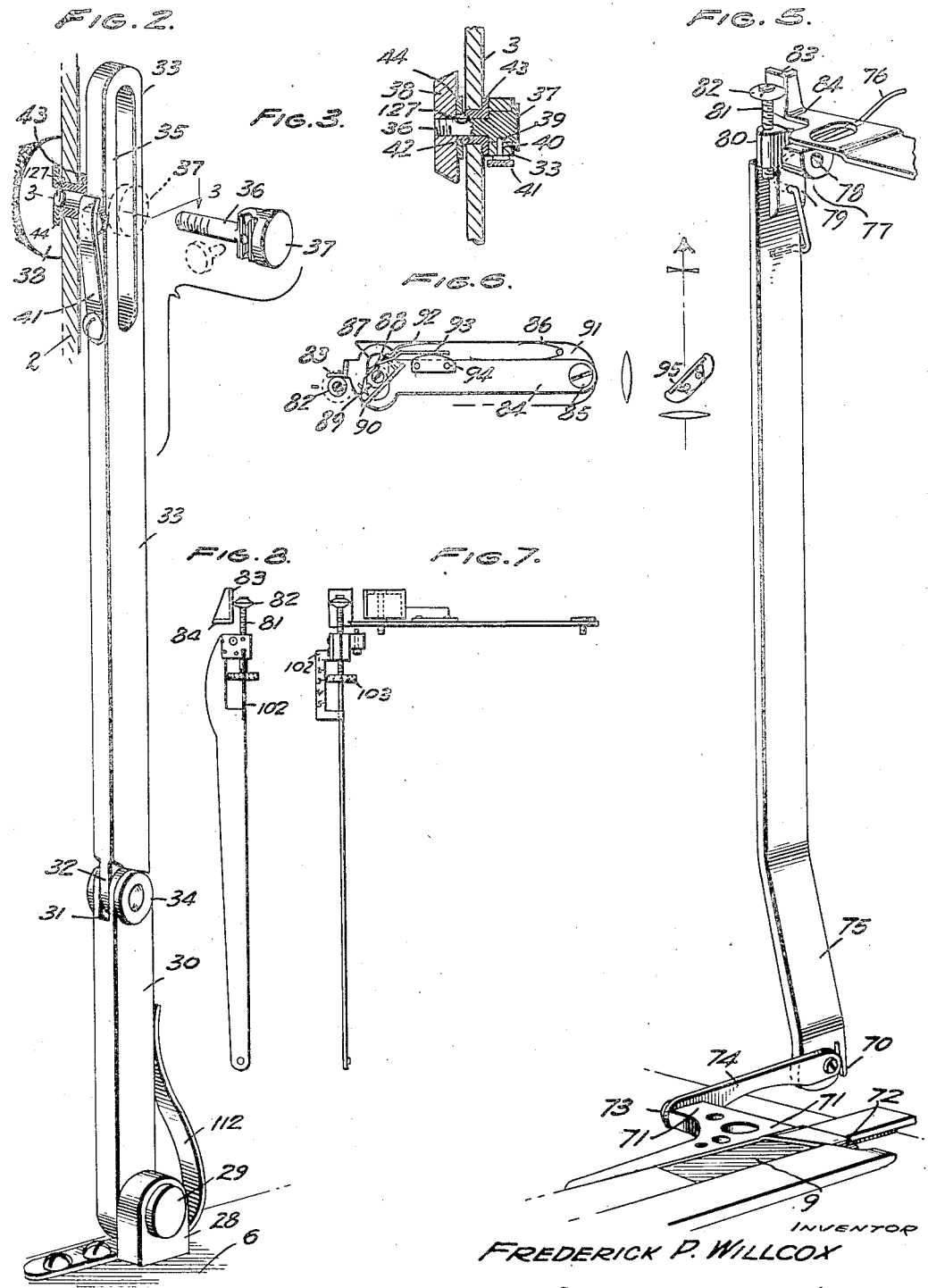

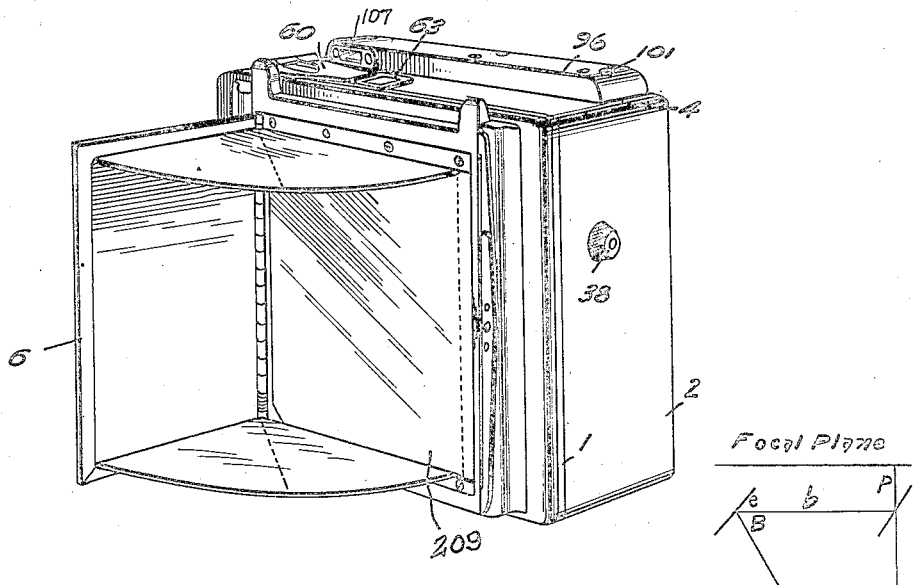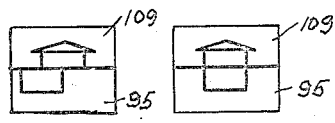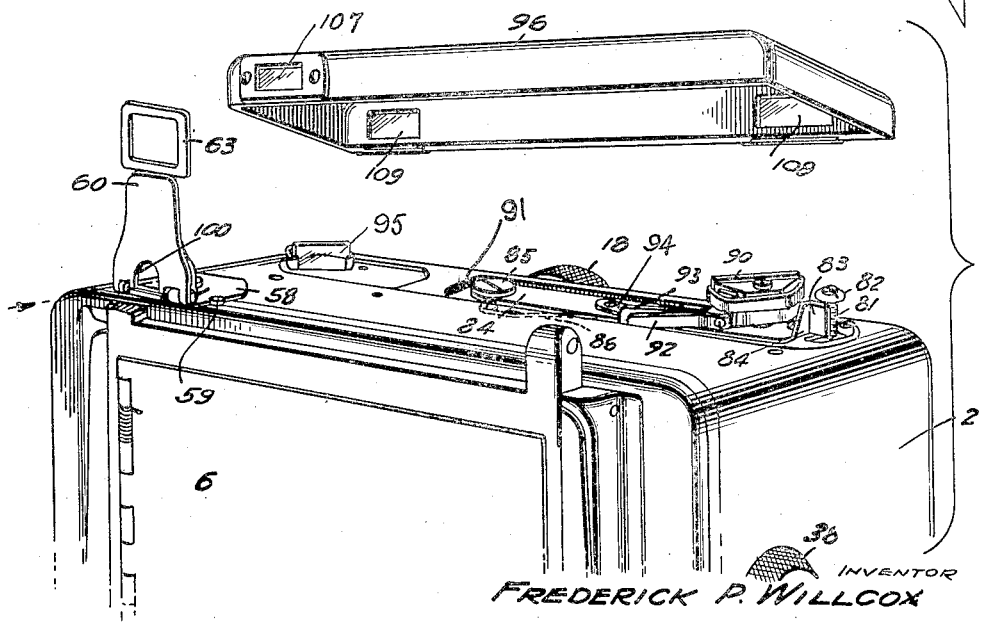

Patented Dec. 24, 1946

2,413,017

UNITED STATES PATENT OFFICE 2,413,017

LENS COUPLED RANGE FINDER FOR CAMERAS

Frederick P. Willcox, United States Army, Arlington, Va.

Application October 16, 1943, Serial No. 506,521

9 Claims. (Cl. 95—44)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to cameras, and more particularly to improvements in range finders and adjusting devices used on cameras.

An object of my invention is the provision of a novel range finder for a camera having one single adjustment which can be easily, definitely and rapidly made by the camera user, not requiring the services of an expert, to coordinate the range finder with any focal length lens which may be used on the camera.

A further object is the provision of a range finder for a camera which has one single adjustment, controlled by an indicating dial, which can be easily and rapidly made to pre-set the range finder for any particular focal length lens which may be desired to be fitted to the camera for the moment, providing the infinity position of the lens on the camera has been previously determined and marked.

A further object is the provision of a range finder for a camera which has a cam so designed and located that the algebraic equation for the angular movement of the range finder mirror for any given distance, and the algebraic equation for the linear advancement of the lens for any given distance are mechanically in perfect agreement for all distances focused upon. Coupled range finders heretofore provided have required two adjustments to set the range finder for the lens to be used on the camera, or can be used only on one specific focal length lens. In making such adjustments, it has been necessary to secure the optimum setting by averaging near and far points. Such adjustments necessarily are made by an expert and not readily or conveniently changed for the use of a different lens on the camera.

A further object is the provision of a range finder for a camera which has a negative lens included in its optical system and so located as to bring the direct and reflected views of the object, as seen through the range finder, to the same size in order to avoid errors in accurately determining the range of the object.

These and other objects are attained by the novel arrangement and construction of parts hereinafter described and illustrated in the accompanying drawings, forming a part hereof, and in which:

Fig. 2 is a perspective view of a brace used for supporting the camera bed in various positions.

Fig. 3 is a sectional view of a portion of the structure shown in Fig. 2.

Fig. 5 is a perspective view of a portion of a range finder structure.

Fig. 6 is a plan view of the range finder.

Fig. 7 is a front elevational view of the range finder embodying a modification.

Fig. 8 is a side of the structure shown in Fig. 7.

Fig. 9 is a rear perspective view of the camera with the rear door open.

Fig. 10 is a rear perspective of the range finder with cover removed.

Fig. 11 shows the position of images in elements of the range finder while being adjusted.

Fig. 12 shows the position of images in elements of the range finder after adjustment.

Fig. 13 is a diagram illustrating formulae used in designing the range finder.

Figure 1:
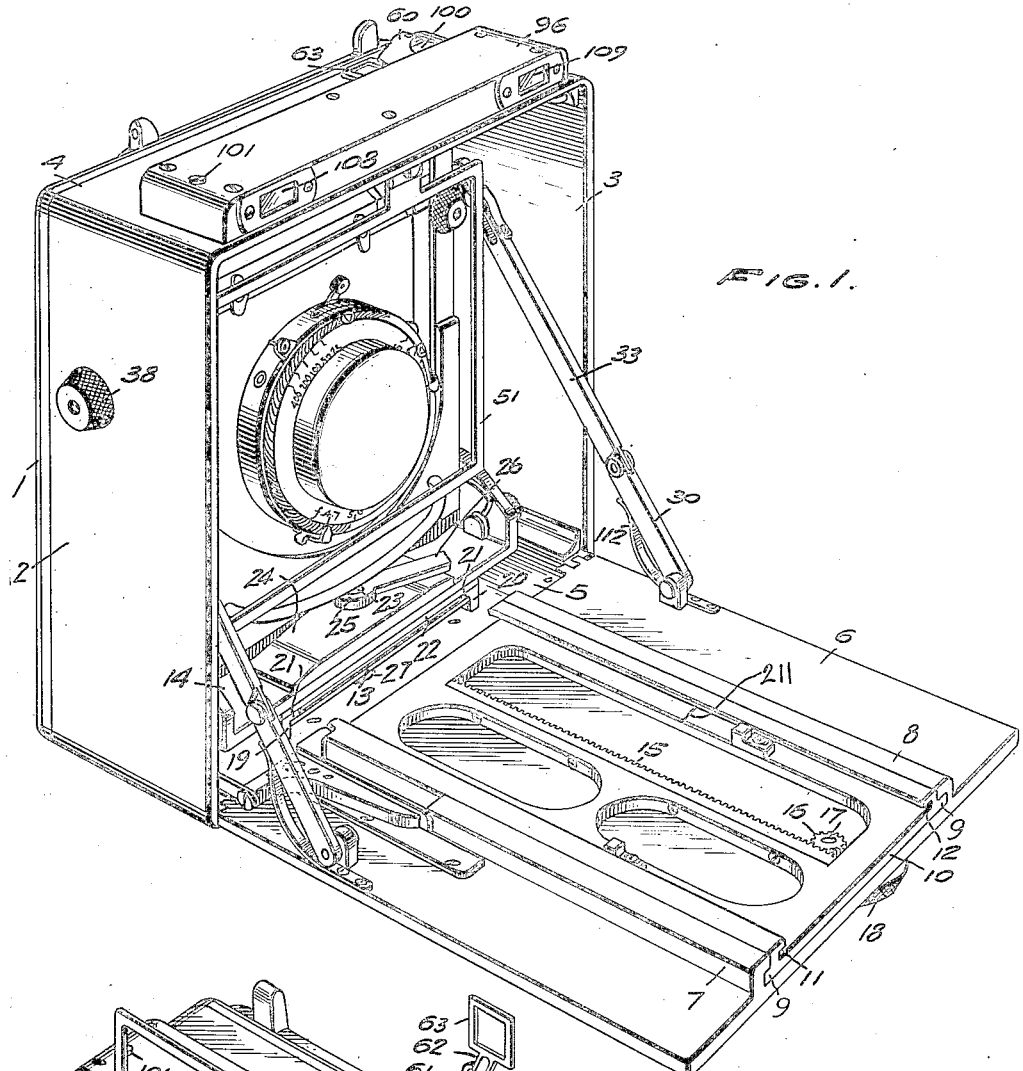
Fig. 1 is a perspective view of a camera embodying the invention.

Referring to the drawings, in Fig. 1, the camera is shown to comprise a casing 1, preferably made of a light weight metal, having side walls 2 and 3, and top and bottom walls 4 and 5, respectively.

Hinged to the bottom wall 5 is a bed 6 which also forms a front wall for the casing. Fixed to the bed 6 are a pair of spaced angle members 7, 8 which together with the bed 6 form grooves receiving the flanges 9 on a plate 10, which has a pair of spaced guide grooves 11 and 12 adapted to receive and guide a plate 13 attached to the underside of the base 14 of the body of the camera.

Attached to the plate 10 is a rack 15 in mesh with a pinion 16 fixed to a pin 17 passing through the bed 6 and fixed to a knob 18. By rotating the knob, the plate 10 can be moved back and forth on the bed 6. The knob 18 is knurled and chamfered or beveled to present a frusto-conical shape which enables it to be easily and positively grasped and be mounted with a minimum of clearance on a flat surface.

The large focusing knob 18 centrally located in a horizontal position near the front edge of the camera bed is easy to hold and enables finer adjustments of focus. Also, being thus located, part of the weight of the camera is supported on the heel or palm of the same hand which is used to manipulate the knob during the focusing operation, and enables the camera to be held steadily. Further, the construction described enables the general thickness and bulk of the camera to be reduced considerably.

The focusing rack 15 shown in the drawings is single and centrally located on the inside edge of the sliding portion of the camera bed. This construction can be modified to use a train of small gears across the front to operate two racks, one on each inside edge of the sliding bed. Such variation in construction allows for still further and greater compactness by removing the center strut of the sliding part and allowing the front of the lens more space to project into when the camera is closed up.

A pair of spaced angles 19 and 20 are mounted on the bottom wall 5, and alined with the grooves 11 and 12 to provide grooves adapted to receive plate 13. The top flanges 21 of the angles are adapted to be engaged on their undersides by the plate 13, and on the upper sides by another plate 22 above and spaced from plate 13. A pin 23 passes through plates 13, 22 and base 14, and through a washer plate 24. The pin 23 is in threaded engagement with a nut 25, the latter having a small integral handle 26. The lower end of the pin has a head 27 to prevent upward movement of the pin; and rotation of the nut 25, by means of the small handle 26, will draw the plates together to clamp them in a fixed position, either when closed, as shown, or in operating position along plate 10.

The bed 6 is supported by a pair of braces connected to the side walls of the casing. Since the structure of the braces is the same on each side, only one side will be described. (See Figs. 2, 3.) Fixed to bed 6 is a lug 28 supporting a pivot pin 29, which pivotally supports a link 30, provided with a groove 31, in which is positioned a tongue 32 projecting from link 33. The links 30 and 33 are pivotally connected by a pin 34. The link 33 has a longitudinal slot 35 in which is positioned a threaded pin 36 having a head 37. Positioned in an aperture in wall 3 is a bearing 42 having an integral flange 43 and a removable washer 44 fixed thereon and abutting a shoulder 127. The flange 43 and washer 44 are positioned on opposite sides of wall 3. The pin 36 passes through bearing 42 and receives a frusto-conical knurled nut 38. By rotating the nut 38 in the proper direction, the link 33 will be clamped tightly in a fixed position between the flange 43 and the head 37. The shoulder 127 spaces the washer 44 from wall 3 to allow the bearing to be freely rotatable in wall 3 when the link 33 is clamped between head 37 and flange 43.

When the bed 6 is opened to a position at right angles to the body of the camera, the links 30 and 33 assume a straight line position being urged constantly forward to said position by spring 112 secured to bed 6. Further movement beyond a straight line extending through links 20 and 33 is limited by design of groove 31 and tongue 32. The camera is closed by depressing the hinged joint between links 30 and 33 in a rearward direction with the thumbs or fingers thus permitting the bed 6 to be moved to a closed position.

It is desirable that some indication be given when the links are in a position to hold the bed 6 at right angles to the body of the camera, that is, in the same plane as the bottom wall 5. Such indication is given by a clicking sound, which can also be felt, and which is produced by a small pin 40 snapping into a recess 39 in pin 37 (see Fig. 3), the pin 40 being constantly under pressure from a flat spring 41 attached to the link 33. the pin passing through an aperture in the link 33.

Figure 4:
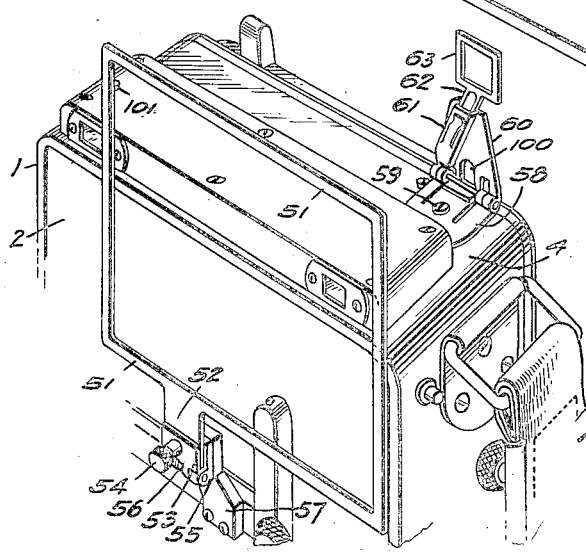
Fig. 4 is a perspective view showing a view finder used with the camera.

In Figure 4 is shown a view finder arrangement which is described in detail in my copending application, Serial No. 580,059, filed February 27, 1945, entitled "View Finder." For the purposes of the present application, it is sufficient to state that it comprises a front frame 51 and a rear frame 63, the latter being supported upon a plate 60 hingedly connected to a plate 58 secured to the top 4 of the camera. Plate 60 has an aperture 100 through which the user views the rangefinder images as will be described below.

The camera is provided with a range finder shown in Figs. 4, 5 and 6. The range finder comprises a shoe 71 sliding on the bed 6 and guided by the angle 7. Attached to the shoe is an arm 72 bearing against the rear edge of the sliding plate 10. Secured to the shoe 71 by an eccentric screw 73 is a link 74 pivoted to link 75 which extends along the inner side of wall 2. A wire spring 76 acts on link 75 to constantly urge the link 75 outward. Struck from the lower end of link 75 is a finger 70 which is adapted to engage link 74 to limit movement of link 75 against the action of spring 76. A block 77 fixed to the underside of the top wall 4 supports a small shaft 78 upon which the upper end of link 75 is pivoted. Fixed to link 75 is a plate 79 carrying a split nut 80 receiving a threaded screw 81 having a bevelled head 82 bearing against a flange 83 extending upwardly from one end of a lever 84, which is positioned in a recess 91 in the top wall 4 and pivoted at 85. A spring 86 bears against the lever 84 and constantly urges the flange 83 into engagement with the head 82. The arm 84 has a slot 87 through which passes a pin 88 upon which is pivoted a block 89 carrying a small mirror 90. Attached to the block 89 is a flat spring 92 bearing against a wall of the recess 91. Also attached to the block 89, is a metal strip 93 urged by spring 92 into engagement with a small cam 94 fixed to lever 84, the cam 94 being flat and having line contact with the strip 93. Mounted on the top wall 4 and adjacent side wall 3 is another small mirror 95 positioned at an angle of 45 degrees to the line of sight which is parallel to the axis of the camera lens.

The small cam 94 has its curved operating edge cut with a configuration designed to give an accurate mechanical solution to the relative location of lenses of various focal lengths and the distances to the objects viewed through the range finder as expressed by the following formulae (see Fig. 18):

$$e = \frac{180 - \tan^{-1}\frac{r}{b}}{2}$$

$$d = \frac{i^2}{r+p}$$

in which $e$ = angle of mirror 90 with the base line (which is also the angle of the mirror with the reflected line of sight).

$r$ = range, or distance of object (in inches).

$b$ = base line of range finder (in inches).

$d$ = lens displacement outward from infinity position (in inches).

$i$ = image distance (distance from lens to focal plane).

$p$ = algebraic distance of focal plane from the base of the range finder.

The range is determined by the formulae:

$$r = b \tan B$$

in which $B$ = included angle formed at mirror 90 by the reflected lines of sight (formed by the base line and the hypotenuse of the right-angled sight triangle).

The mirrors 90 and 95, and the elements associated therewith, are housed in a small casing 96, provided with a window lens 109 adjacent mirror 95, and a window 108 for mirror 90. The rear of the casing is provided with a window 107 through which the object being photographed can be directly seen through window lens 109.

An image of the object is simultaneously reflected from mirror 90 to mirror 95. To accommodate the range finder to lenses of different focal lengths, the screw 81 is adjusted. This adjustment can be made through an aperture in the casing 96 normally covered by a small screw 101. The manner of adapting for different lenses is described below.

In a range finder it is desirable to bring the direct image of the object to the same size as the reflected image to avoid errors when the range of the object has been determined. The difference in size is due to the reflected line of sight being longer than the direct line of sight to the object. To equalize the sizes of the two images, window lens 109 is made slightly negative in power. This causes the size of the image of the object seen through window lens 109 to be the same as that of the image which is reflected from mirror 90 to mirror 95.

In using the range finder to focus the camera lens, a portion of the object being photographed is viewed through aperture 100 in plate 60 and through window 107 where the two images will be seen, one above the other. The upper part of the object is directly seen through window lens 109 over the top of mirror 95, and an image of the lower part of the object passes through window 108 and is reflected from mirror 90 to mirror 95. (See Fig. 11.) To focus the camera lens, the knob 18 is rotated to move the plate 10 supporting the lens to cause spring 76 to move link 75 and associated parts to adjust the angle of mirror 90 until the images seen in mirror 95 and through lens 109 are in vertical alinement. (See Fig. 12.)

The operating cam 94, which maintains the mechanical relation of the equation for linear advancement of the camera lens with the angular equation of the range finder, is set in position at the factory.

The eccentric screw 73 is used to set the link 75 in such a position that the axis of the main adjusting screw 81 is parallel with flange 83 when the sliding plate 10 is positioned at its rearward limit of movement, that is, infinity position (see Fig. 1). This is normally a factory adjustment and is made by screwing the main screw 81 in and out, with plate 10 at its infinity position, and observing if any angular movement of mirror 90 takes place. If mirror 90 moves, eccentric screw 73 is adjusted to alter the position of link 75 until there is no further movement of mirror 90 when screw 81 is screwed in or out.

The infinity position of link 75 and lever 84 is the same for all lenses used on the camera, and adjustment to accommodate the range finder to each different lens is made by rotating screw 81 when the lens has been located at its particular infinity position.

To adjust the range finder, the camera is placed on a solid support such as a tripod, and the sliding plate 10 is set at its infinity position. (See Fig. 1.) The lens supporting assembly, base 14 with its associated parts, is carefully slid back and forth on plate 10 until the lens is in focus at infinity on some object over 500 feet away, as determined by the image on the ground glass focusing panel 209 of the camera (see Fig. 14). The holding assembly is locked in this position by means of lever 26, and this infinity position is marked on plate 10. (See line 211 of Fig. 1.) In this manner the infinity position for each different lens can be determined and the various infinity positions marked on the plate 10.

Once the infinity position for a particular lens has been determined and marked on plate 10, that particular lens is set at that position and locked in place by lever 26. Focusing on objects is then made by moving plate 10 back and forth by means of knob 18 and viewing the object through the ground glass until the camera lens has been focused. The small plug 101 in the top of casing 96 is removed and a screw driver is used to adjust screw 81 until the same object is in focus in the range finder with the two images of the object in vertical alinement (see Fig. 12). The range finder is now set for the particular lens being used and no further adjustment is necessary until a different lens is used. To focus on any other object after the above adjustment, it is only necessary to manipulate knob 18 to move plate 10 until the images are alined as shown in Fig. 17.

This is the only adjustment necessary and this single adjustment can be made easily, definitely, and rapidly by the camera user to coordinate the range finder with a lens of any focal length which may be used on the camera. Range finders heretofore provided on cameras either require two adjustments to average near and far points, or they can only be used for one specific focal length lens.

In the construction shown in Figs. 7 and 8, the threaded adjusting screw 81 has affixed to its lower end an indicating dial 103 which has figures engraved on its periphery to indicate the angle through which the screw is rotated. The extent to which the screw is moved up or down is indicated by a vertical scale located on strip 102 which is formed from link 75. Indicating dial 103, which is attached to adjusting screw 81, provides means for pre-setting the range finder for any camera lens the user may desire, providing the infinity position of the lens has previously been determined and marked on plate 10 and the position of screw 81 for the same lens, as shown by dial 103 and scale strip 102, has been previously determined and recorded. In this construction it is not necessary to use a screw driver to adjust screw 81 as adjustment is accomplished by rotating the indicating dial 103.

The invention having been described, what is claimed is:

1. In a photographic camera having a casing and a movable bed for carrying the camera lens, a rangefinder comprising a pair of spaced reflectors arranged to provide adjacent partial images of an object from different viewpoints, the angular relation of said reflectors being adjustable to permit coincidence of said images, means for adjusting the angular relationship of said reflectors, comprising an arm connected to one of said reflectors for pivotal movement thereof, a second arm movably mounted in said casing and carrying a cam arranged to engage the first arm, a flange on said second arm, a shoe adapted to be engaged and moved by said movable bed, a third lever-like arm pivotally mounted in said casing and connected to said shoe so as to be rotated by movement of said shoe, and means of adjustable effective length mounted on said third arm and arranged to contact said flange at different distances from the pivot of said third arm, whereby the transmission ratio between the shoe and the movable reflector may be adjusted to accommodate for camera lenses of different focal lengths.

2. In a photographic camera having a casing and a movable bed for carrying the camera lens, a rangefinder comprising a pair of spaced reflectors arranged to provide adjacent partial images of an object from different viewpoints, the angular relation of said reflectors being adjustable to permit coincidence of said images, means for adjusting the angular relationship of said reflectors, comprising an arm connected to one of said reflectors, for pivotal movement thereof, a second arm movably mounted in said casing and carrying a cam arranged to engage the first arm, a contact surface on the second arm, a shoe adapted to be engaged and moved by said movable bed, a third lever-like arm pivotally mounted in said casing and connected to said shoe, so as to be rotated by movement of said shoe, and means of adjustable effective length on said third arm and arranged to engage said contact surface at different distances from the pivot of said third arm, whereby the transmission ratio between the shoe and the movable reflector may be adjusted to accommodate for camera lenses of different focal lengths.

3. A photographic camera in accordance with claim 1, in which the means of adjustable effective length comprises a screw member having its axis substantially parallel to said third arm and threadedly engaging a split friction-nut secured to said third arm.

4. A photographic camera in accordance with claim 2, in which the means of adjustable effective length comprises a screw member having its axis substantially parallel to said third arm and threadedly engaging a split friction-nut secured to said third arm.

5. A photographic camera in accordance with claim 1, in which the means of adjustable effective length comprises a screw member having its axis substantially parallel to said third arm, and threadedly engaging a split friction-nut secured to said third arm, and cooperating means on said screw member and said third arm for indicating the effective length of said screw member.

6. A photographic camera in accordance with claim 2, in which cooperating elements are provided on the parts for indicating the adjustment of said means of adjustable effective length.

7. A photographic camera of the type including an adjustably mounted lens, a rangefinder, and means coupling said lens to said rangefinder, said coupling means comprising a pivotally mounted lever arm having a fixed length on one side of its pivot, a screw threaded member engaging in a nut on said arm and extending to the other side of the pivot, and providing a variable effective length of said arm on the other side of the pivot, whereby the coupling may be adjusted to accommodate lenses of different focal lengths.

8. A camera in accordance with claim 7, in which cooperating elements are provided on said arm and on said screw threaded member for indicating the adjustment of said screw threaded member relative to said arm.

9. In a photographic camera, the combination of an adjustably mounted lens, a range finder having at least one adjustably mounted reflector, and means for coupling said lens to said range finder and for providing an adjustment whereby said range finder may be employed for accurately determining the range while focusing with lenses of different focal lengths, which comprises two levers movable in planes disposed at substantially a right angle, one said lever having operative connection to the movable reflector and the other having connecting means by which it is attached for movement with the lens as the latter is focused, and means for transmitting movement of the second lever to the first comprising a knife-edged contact member carried by one of the levers and engageable with the other, and adjustable for varying the effective length of one of the levers only.

FREDERICK P. WILLCOX.